July 2, 1940.  F. E. NELSON  2,206,291
UNIVERSAL COUPLING
Filed Oct. 11, 1938  3 Sheets-Sheet 1
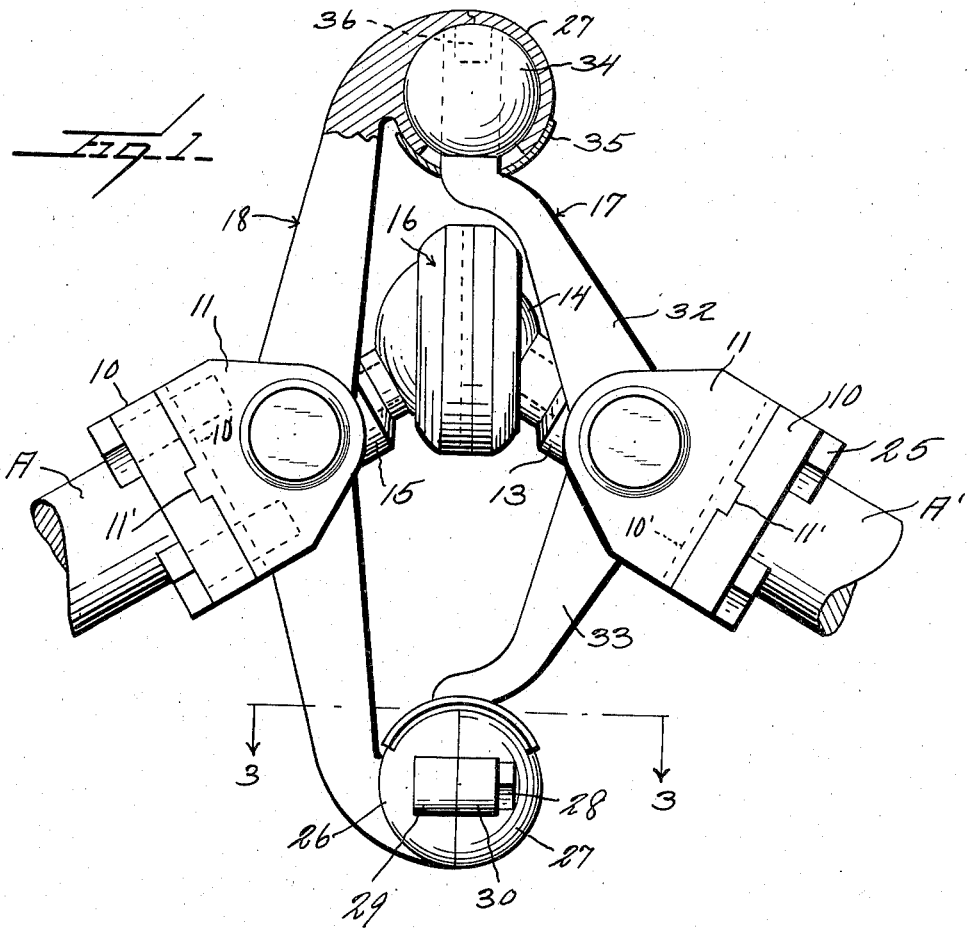
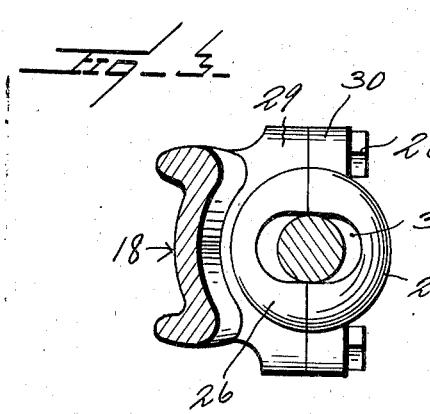
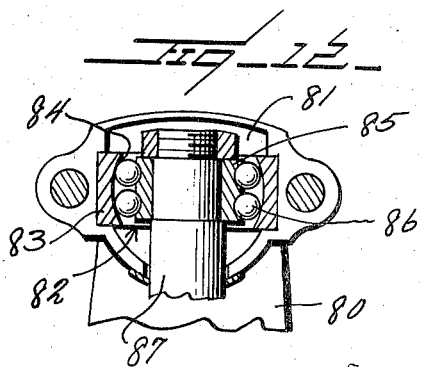
Inventor
F. E. Nelson
By Watson E. Coleman
Attorney July 2, 1940.  F. E. NELSON  2,206,291
UNIVERSAL COUPLING
Filed Oct. 11, 1938  3 Sheets-Sheet 2
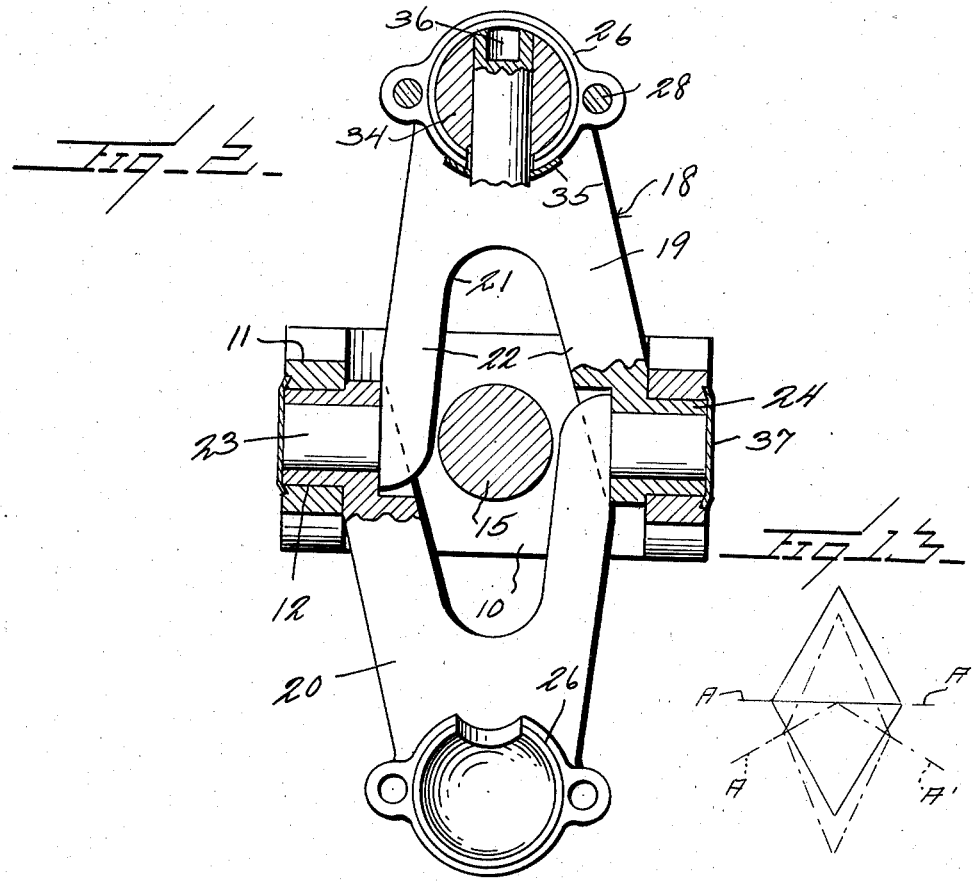
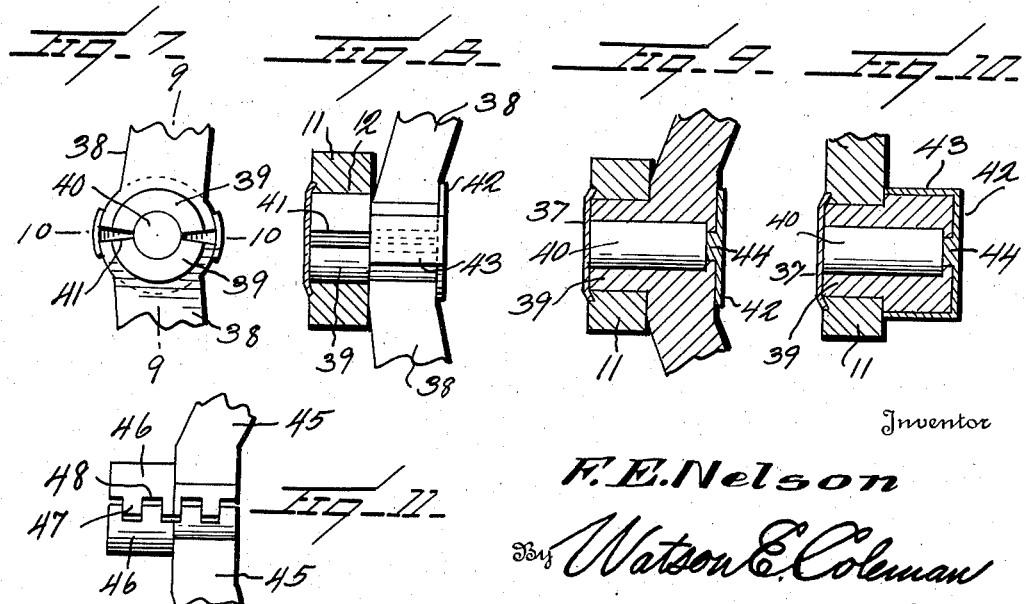
Inventor
F. E. Nelson
By Watson E. Coleman
Attorney July 2, 1940.                     F. E. NELSON                    2,206,291
                               UNIVERSAL COUPLING
                              Filed Oct. 11, 1938                3 Sheets-Sheet 3
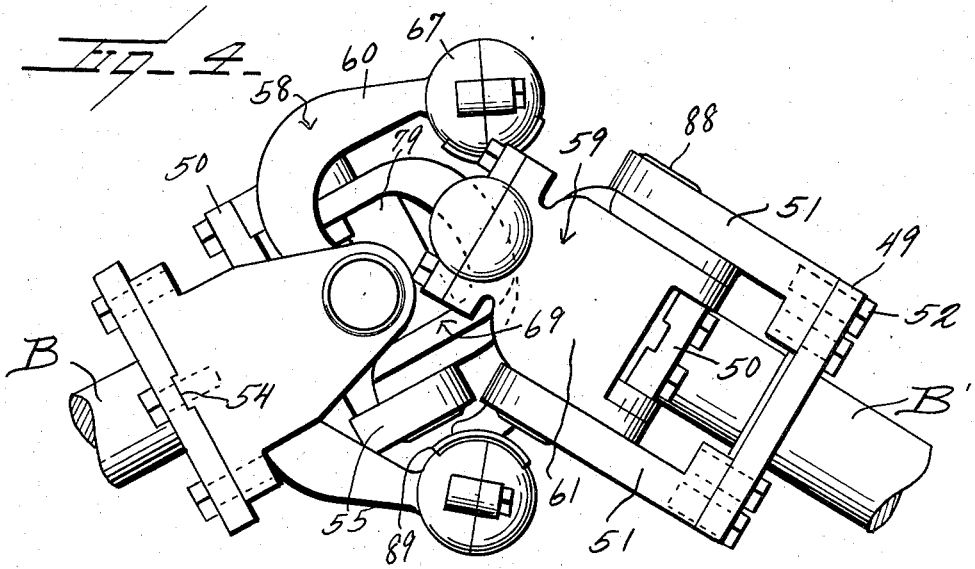
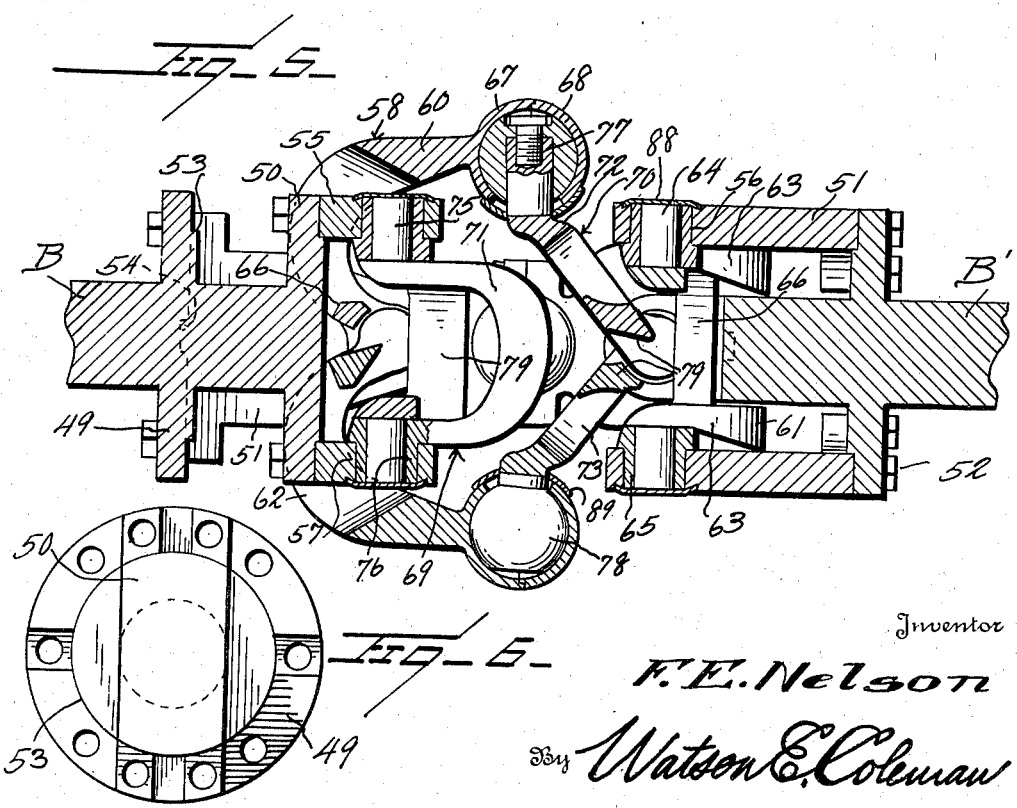
Inventor
F. E. Nelson
By Watson E. Coleman
Attorney Patented July 2, 1940

2,206,291

UNITED STATES PATENT OFFICE 2,206,291

UNIVERSAL COUPLING

Frank E. Nelson, Belmont, Mass.

Application October 11, 1938, Serial No. 234,475

3 Claims. (Cl. 64—21)

This invention relates to improvements in universal joint couplings and constitutes a variation of my universal spring toggle joint or coupling which comprises the subject-matter of prior application, Ser. No. 218,447, filed July 9, 1938 and now matured into Patent No. 2,137,179, dated Nov. 15, 1938.

The present invention has for its object to provide a novel universal joint coupling wherein are provided pivotally connected arm members having pivotal connection or attachment to shafts which they join together, such pivotally connected arm members distinguishing from the corresponding arm members of my prior application in that they are of rigid form rather than flexible and operate to permit rotation of the joined or coupled shafts at an angular relation with one another through the medium of a novel pivotal attachment to said shafts rather than through the medium of a flexing action.

Another object of the invention is to provide a universal joint coupling having a plurality of pivotally connected arm members pivotally attached to adjacent shaft ends in such a manner as to permit transmission of rotary power from one shaft to another without change in rotary motion, when the shafts are in angular relation, without the employment of an interposed centering unit between the shaft ends.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates a simple form of the present invention showing the connected shafts at the maximum operating angle.

Fig. 2 is a sectional view through the joint as shown in Fig. 1 and at right angles to the connected shafts when the latter are in alined relation, portions of the connections between the arms of the joint being removed.

Fig. 3 is a sectional view taken substantially on the line 3—3 of Fig. 1.

Fig. 4 is a view illustrating in side elevation a form of joint constructed in accordance with the present invention and constituting a combination of two joints of the type disclosed in Fig. 1.

Fig. 5 is a sectional view taken longitudinally of the joint structure of Fig. 4 when the coupled shafts are in alined relation.

Fig. 6 is a view in end elevation of one of the shafts illustrated in Fig. 4.

Fig. 7 illustrates a modified form of hinge connection between two arms of the joint and at one side thereof.

Fig. 8 is a view in side elevation of the joint of Fig. 7, the supporting bearing therefor being in section.

Fig. 9 is a sectional view taken substantially upon the line 9—9 of Fig. 7.

Fig. 10 is a sectional view taken substantially upon the line 10—10 of Fig. 7.

Fig. 11 illustrates a modification of the joint shown in Fig. 7.

Fig. 12 illustrates a modified or substitute form of connection between two arms of a coupling.

Fig. 13 is a diagrammatic view illustrating the principle of operation of the joint constructed in accordance with the present invention.

Referring now more particularly to the drawings and especially to Fig. 13, it will be noted that the joint structure embodying the present invention has a basic diamond configuration or design, the minor axis of the design being indicated by the line A—A' and representing the axial or rotary centers of coupled shafts when the same are in alined relation. In this universal joint coupling, the minor axis of the diamond design is controlled and although this diamond-shape must change slightly in order that the joint may function at any position of the shafts other than when they are rotating in line with each other, the basic diamond design is maintained. In this design diagram, the solid line diamond form shows or represents the shape of the simple form of the coupling as shown in Fig. 1, when the shafts are in alined relation while the dotted line illustration of the diamond shows the shape to which the same is changed when the shafts are disposed at an angle of approximately 120° with respect to each other. In my prior application, previously referred to, this change in the basic formation of the joint is taken care of by the flexibility of the arms connecting the shafts whereas in the present application the joints are constructed in heavier form and with rigid arms and the angular changes occurring in the diamond-like form which the arms assume, are taken care of by novel hinge joints between the arms and the shafts.

In Fig. 1, there is illustrated a simple form of joint constructed in accordance with the present invention wherein the shafts are designated A and A'. While in the following specification reference will be made to the connection of adjacent shaft ends by the universal joint, it is to be understood that the invention is not intended to be limited to the connection of shafts as it will be obvious that joints of the character disclosed may function to couple together any two bodies having relative movement and rotary motion.

In carrying out the present invention, each shaft has secured thereto adjacent its end, a plate or collar 10 and mounted upon each of these plates upon opposite sides of the adjacent shaft is a pair of bearing ears, each of which is indicated by the numeral 11 and each having a bearing opening 12 therethrough, the openings being axially alined perpendicular to the shaft. In this particular form of the joint or coupling, each shaft is reduced slightly in the portion which extends beyond the plate or collar 10, and as shown in Fig. 1, the shaft A' has a reduced portion 13 which is provided in its end with a longitudinal bore or socket into which is extended and suitably secured a stem forming a part of a ball head 14. The shaft A has a similarly reduced portion 15 which is provided with a longitudinal bore for the reception of a carrying stem for a socket 16. No detailed illustration has been made of the ball and socket connection as such details are disclosed in a similar connection shown in my co-pending application, Ser. No. 218,447, and in addition the specific type of coupling which may be employed here is unimportant so long as there is provided a suitable connection between the ends of the shafts by which the shafts may be kept centered at all times during the rotation thereof.

Each pair of bearing ears 11 has a pair of arm members pivotally mounted therebetween, one pair of such members being generally designated by the numeral 17 while the opposite pair is designated generally by the numeral 18. Each of the pairs of arms is joined to its pair of supporting bearing ears 11 in the same manner and in the same relation to one another, therefore, a description of the pivotal connections between a pair of arms when given with reference to or in referring to one specific pair, will apply equally as well to the other pair, therefore, in referring to Fig. 2, wherein the arms of the pair 18 are shown, it will be understood that the manner of connecting these arms is the same as the manner of connecting the arms of the pair 17.

In referring to Fig. 2, it will be seen that the pair of arms are each individually identified by the numerals 19 and 20, and each arm is in the form of an elongated substantially flat body having a greater width at its inner end than at its outer end and provided at its inner end with the division 21 so that it forms the two furcations 22. One furcation of each arm carries a laterally extending pivot stud 23 while the other furcation terminates in the laterally extending bearing sleeve 24. As shown in Fig. 2, the overall width of each arm is materially less than the distance between the pair of bearing ears with which it is connected so that the pair of arms may be connected together with the pivot pin 23 of one extending through the bearing sleeve of the other in the manner illustrated and both joined ends of the arms placed between the bearing ears, with the bearing sleeves 24 extending into the bearing openings 12. When the arms are assembled in this manner in connection with the ears 11, the ears may be secured to their supporting plates 10 by bolts 25 in the manner shown in Fig. 1.

The outer ends of the arms 19 and 20 are formed to provide half sockets 26 for a ball and socket joint, each of these half sockets having associated with it a removable cap 27 which is secured to the adjacent half socket by bolts 28 passing through alined ears 29 and 30 upon the half socket and cap respectively. There are thus formed complete ball sockets at the remote ends of the arms 19 and 20 and the centers of these ball sockets pass through the center of the coupling between the ends of the two shafts. In other words, the centers of the two sockets are in a plane perpendicular to the shafts when the latter are in alined relation and in the same plane at all times with the center of the joint connecting the shaft ends, in the present instance, the ball and socket centering connection shown in Fig. 1.

Upon the inner side of each of the ball sockets carried by the arms 19 and 20, the cap and half socket portion are provided with adjacent openings forming the elongated recess 31, as shown in Fig. 3, this recess being seen as illustrated in Fig. 3 when looking toward a socket from the center of the universal joint. In the pair of arms designated by the numeral 17, the two arms making the pair are indicated individually by the numerals 32 and 33 and, as previously stated, they are formed at their inner pivotally connected ends in the same manner as the arms 19 and 20 shown in Fig. 2, but at the outer end each of these arms carries a ball 34 which extends into the socket of an arm of the pair 18 and the terminal portion of each of the arms 32 and 33 which extends into the ball 34 passes through the recess 31 of a socket and extends radially with respect to the center coupling 16.

Secured about the outer portion of each of the arms 32—33 is a circular shield 35 which conforms to the curvature of the adjacent ball socket and covers the recess 31 thereof. This shield performs the function of retaining lubricant in the socket and in addition prevents the entrance thereinto of water, dirt and other foreign matter.

In order that the ball and socket joint between the adjacent ends of the arms may be continuously lubricated, the outer end of each of the arms which carries the ball 34 is provided with a lubricant pocket 36 which is filled with a suitable grease before the ball is enclosed in the socket and this grease will then be slowly fed to the confronting faces of the ball and socket as it is softened through development of heat in the operation of the universal joint.

In order that the connections between the pivot pins 23 and sleeves 24 may be protected as much as possible against the entrance of dirt, there is provided a cover cap 37 which has a portion of the periphery thereof turned slightly at an angle to the plane of the cap and this edge portion of the cap is pressed into a suitable recess in the outer face of each bearing ear 11 so that the cap will cover the ends of the pins and sleeves as shown in Fig. 2.

With the universal joint thus described, it will be readily apparent that upon rotation of one of the shafts, corresponding rotary motion will be transmitted in constant velocity to the other shaft whether these shafts are arranged in alined relation or in the angular relation shown. If the shafts are alined, then, of course, there will be no change in the diamond-like design which the joined pairs of arms form, but if the shafts are in angular relation, then the form of the diamond will be changed slightly along the minor axis as illustrated in Fig. 13, where it will be seen that while the connected ends of the shafts remain in the plane of the major axis of the diamond, the angles of the diamond along the minor axis will vary, thus increasing and decreasing the width of the diamond and changing the length of the same. This action is, of course, permitted by reason of the fact that the connected ends of the pairs of arms have relative universal motion and the connection between the ends of the arms and the shafts is of a pivotal nature permitting the centers of rotation for the axes passing through the joints between the arms and the shafts to move together and apart.

In Figs. 7 to 11, inclusive, there are illustrated two modified forms of joint connection between the inner ends of the arms and the bearing ears. Referring particularly to Figs. 7 to 10, inclusive, there are shown portions of the inner ends of two arms which are indicated by the numerals 38, these arm portions corresponding to a pair such as is designated by the numeral 17 or the numeral 18. In the modified form of joint here shown, each arm at its inner end is provided with a laterally extending sleeve section 39 which is slightly less than a semi-cylinder and these sleeve sections are arranged with their grooved or inner faces in opposed relation and with a separating pivot pin 40 disposed therebetween so as to form a split sleeve such as is shown in Fig. 7 which is adapted to extend into the bearing opening 12 of an ear 11. It will thus be seen that the two coupled inner ends of the arms 38 are permitted rocking motion upon the interposed pin 40 within the bearing ear aperture 12, this rocking movement upon the pin 40 being possible by reason of the recesses formed between the partial sleeves 39 as indicated at 41 in Fig. 7.

The outer ends of the partial sleeves 39 and the pin 40 are covered by a plate 37 such as is shown in Figs. 1 and 2, while the entrance of dirt into the bearing at the inner end is prevented by the provision of the cover plate 42 having extending therefrom at diametrically opposite sides the spring arms 43 which are adapted to position upon opposite sides of the partial sleeves 39, as shown in Figs. 7 and 8 to cover the recesses 41. At the center of the inner cover plate 42, a button or plug portion 44 is provided which enters the area between the partial sleeves and at the inner end of the pin 40 so as to close the same and also to center the plate 42. With this bearing connecting means between the joined inner ends of the arms, it will be seen that the furcations of two adjacent arms are disposed substantially in opposed or alined relation instead of being offset or one overlapped on the other as in the connection shown in Fig. 2.

Fig. 11 illustrates a slight modification of the hinge joint illustrated in Fig. 7. In this modified form adjacent arms are designated by the numerals 45 and the lateral sleeve portions 46 corresponding to the partial sleeves 39 have their confronting faces provided with the teeth 47 and recesses 48 which are in meshed or interlocked relation. These partial sleeve sections position upon a center pin (not shown) like the sleeve sections 39 and are disposed in the bearing opening of an ear 11 in the same manner as described in connection with the forms of the hinge shown in Figs. 7 to 10.

Figs. 4 and 5 illustrate a more complex form of the universal joint shown in Fig. 1. This form of the joint may be termed an accommodation universal joint for the reason that it not only permits angular disposition of the shafts or other bodies which it couples together but also permits of a certain degree of movement between these shafts toward and away from one another. In this form of joint the connected bodies, here illustrated as shafts, are designated B and B¹. Each of these shafts carries adjacent one end a collar or plate 49 and, at the end, a cross plate 50. Each of the collars carries a pair of relatively long bearing ears, each of which is designated 51, and which are disposed diametrically opposite with respect to the adjacent shaft. These bearing ears are held on their respective plates by bolts 52 and are prevented from having shifting or sliding movement and by the provision of a shoulder 53 engaging a suitable recess in the end of the adjacent ear and a key carried by the ear as indicated at 54, and engaging in a suitable slot in the plate. This key and shoulder serve to relieve the bolts of some of the strain of holding the bearing ears in position. The cross plate 50 extends between and parallel with the inner faces of the ears 51 and upon each end of each cross plate is a short bearing ear 55. The bearing ears 51 have bearing apertures 56 therein and the shorter ears 55 have corresponding bearings 57 and it will be observed that the four bearing ears supported by each shaft are separated a distance of 90° between the centers of the bearing openings and also that the bearing openings of the four ears of each shaft have their axial centers in the same plane transversely of the shaft. It will also be seen upon reference to Fig. 5 that in the assembled accommodation joint, the longer bearing ears 51 of one shaft are directed toward and are in end opposed relation with the shorter bearing ears 55 of the other shaft.

Each pair of bearing ears 51 has pivotally connected or hinged thereto a pair of longitudinally curved coupling arms, the pair being designated for the shafts B and B', respectively 58 and 59, and the individual arms for the pair 58 being designated by the numeral 60 while those arms for the pair 59 are individually designated by the numeral 61. Each of the arms 60 and 61 is broadly in the form of the letter C and at its inner or shaft attached end is bifurcated to form the furcations 62 and 63, respectively. This bifurcation of the arms 60 and 61 permits of the connection of these arms with their respective pairs of ears 51 without interference from the shorter ears 55 as the bifurcation permits the curved arms to straddle the shorter ears. This is clearly illustrated in Fig. 5.

Each of the curved arms has one furcation which terminates in a laterally directed pivot pin 64 while the other furcation of the same arm terminates in a sleeve 65, and in the assembly of each pair of arms, the bearing pins 64 are positioned in the bearing sleeves 65 so that the adjacent or inner ends of the furcations of each pair of arms are in overlapped relation or in the same relation as the inner ends of the arms of the joint shown in Fig. 1.

In order that the curved arms may be suitably strengthened, the ends of the furcations are joined by cross brace bars 66 which extend across the end of the adjacent shaft between the adjacent short ears 55.

Each of the curved arms terminates at its outer end in a half socket 67 which has secured thereto a semi-spherical cap 68 which forms with the half socket a complete ball socket.

Each pair of short bearing ears 55 has hingedly connected therewith and disposed therebetween the overlapped joined ends of a pair of relatively straight arms, these pairs of arms being generally designated by the numerals 69 and 70, and the individual arms for the pair 69 are indicated by the numeral 71 while those for the pair 70 are indicated by the numeral 72. Each of these straight arms is bifurcated at its inner end and the furcations are designated 73 and 74, respectively, for the arms 72 and 71.

Each of the arms 71 and 72 has one furcation which terminates in a lateral pivot pin 75 while the other furcation terminates in the pivot sleeve 76 and in the assembly of each pair of the straight arms, the ends of the furcations are disposed in overlapped relation with the bearing pins 75 in the adjacent bearing sleeves 76, and these sleeves are supported in the bearing openings 57 of the short ears.

The outer end of each straight arm terminates in an angularly directed outwardly extending straight pin or stem 77 which extends into a ball 78. Each of these balls is encased in a socket of a curved arm which is in the same plane longitudinally of the shafts as the arm supporting ball. Thus it will be seen that each pair of relatively straight arms is joined at its outer ends with the outer ends of a pair of curved arms and these joints or couplings between the sets of arms upon the two shafts are separated 90° apart and since the distance between the axial centers of the hinges for each pair of arms and the joints at the outer ends thereof is the same throughout the coupling, the arm to arm joints or connections which, as previously stated, are four in number, lie in the same plane transversely of the shafts or connected bodies. This plane remains the same at all times whether the shafts remain in alinement or whether they assume an angular relation as shown in Fig. 4.

As the relatively straight arms are bifurcated at their inner ends like the curved arms, reinforcing means is made use of in the form of transverse bars 79 which extend across the ends of the adjacent shafts outwardly from the bars 66 or, in other words, nearer to the plane of the arm to arm joints. These connections are clearly shown in Fig. 5, together with the connecting or reinforcing bars 66.

It will be observed that in the form of universal coupling shown in Figs. 4 and 5, the centering and thrust element has not been made use of. For this reason this joint has been termed an accommodation type of joint because it not only permits of the transmission of constant rotary power from one shaft or body to another without the loss of rotary velocity but it also permits of a certain degree of movement of the connected parts toward or away from one another. This joint, therefore, cannot only serve as a universal joint but also serve the duty now performed by an outside slip joint which is so frequently furnished with and considered an essential part of a universal joint construction.

While there has been shown and described the two flanges or plates 49 and 50 upon which the long and short ears are mounted, it is possible to build the device with only a single supporting flange where it is not required that the shafts or other coupled bodies assume an angular relation of more than 30°. By the construction shown, an angular relation of the shafts or connected bodies of at least 60° is possible without interfering with the transmission from one shaft to another of rotary movement of constant velocity.

While the curved arms have been described as being formed with the sockets for the reception of the balls of the straight arms, it is to be understood that this arrangement may be reversed if found desirable or other types of pivotal or universal couplings may be established between the outer ends of the arms in both forms of the universal joint shown. For example, there may be used a joint or coupling of the character shown in Fig. 12, wherein there is indicated the outer end portion of an arm which is designated 80 and which may be taken as representative of any one of the arms of the two joints, which terminates in a casing or housing portion 81 for a bearing unit 82 consisting of an outer race 83 having a rounded bearing surface 84, and an inner race 85 which is maintained within the outer race and in spaced relation with the surface 84 by the anti-friction members or balls 86. The inner race is secured to and about an arm 87 which may be taken as representative of any one of the arms of the couplings and thus it will be seen that with this arrangement, the outer ends of a pair of arms, here designated as 80 and 87, will be joined for universal movement in the same manner as those arms shown in the two types of bearings described, which are connected by ball-and-socket joints. It is, therefore, to be understood that where the claims refer to a universal coupling or joint between the outer ends of the hingedly connected arms, any type of universal connection is intended.

It is also to be understood that in referring to hinge connections between the inner ends of the arms and the shafts or the bearing ears, this may be taken or understood to mean the types of hinge joints shown in Figs. 2 and 5, or the types shown in Figs. 7 and 11.

In the joint illustrated in Figs. 4 and 5, the hinge connections between the inner ends of the several pairs of arms are to be covered by the plates 88 which are applied in the same manner as described in connection with plates 37 and also the arms carrying the balls 78 are provided with shields 89 to cover the openings leading into the sockets through which the ends of the ball carrying arms pass.

While the parts of the several hinge joints connecting the arms with the shafts have been shown as in direct contact one with another, it is contemplated that there shall be used a suitable anti-attrition material between such surfaces, such as Babbitt metal or the like, unless other types of bearings such as needle, roller or ball bearings are used.

From the foregoing, it will be readily apparent that in the present invention there has been disclosed a universal joint coupling by means of which rotor speed may be readily transmitted from one rotary member to another without loss of velocity of rotation or, in other words, with a constant velocity of rotation and also the joint is of such design, as set forth in Figs. 4 and 5, that a certain degree of linear expansion and contraction is permitted. This expansion and contraction is accomplished primarily by the changing of the minor axis of the diamond figures defined by the connected arms. The diamond structures defined by the connected arms act as driving units as well as centering units but this form of the coupling does not require the use of a thrust unit such as is shown in the coupling illustrated in Fig. 1 and for this reason, the driving shafts are permitted to approach each other or to recede as may be necessary during the rotation of the shafts. This motion of the shafts is and must be towards the point of shaft angularity or away from it.

It will be noted that the bearing gears 11 are to be coupled with the supporting plates 10 by shoulders and keys such as are shown in connection with the attachment of the bearing ears to their supporting plates in the coupling of Figs. 4 and 5. The bearing ears of Figs. 1 and 2 have the keys thereof designated 11' and the shoulders of the plates 10 designated 10'. While the bearing ears shown in Figs. 8 to 10 inclusive have not been illustrated as attached to supporting plates such as the plates 10 of Figs. 1 and 2, it will be understood that these ears will be keyed to such supporting plates in the same manner as the ears shown in Figs. 1 and 2.

What is claimed is:

1. A universal coupling for joining together a pair of rotatable bodies, comprising two pairs of coaxial bearings supported upon each body, the said bearings being disposed with the coaxial centers of the two pairs in perpendicular relation in a plane extending transversely of the rotary center of the body and intersecting in the longitudinal center of the body, a pair of arm members associated with each pair of bearings, each pair of arm members being pivotally joined together and to a pair of bearings whereby the arms of each pair may have independent oscillatory movement, and universal coupling means between the other ends of the two pairs of arms associated with one body and the other ends of the two pairs of arms associated with the other body, the said arm to arm connections and the arm to body connections facilitating the rotation of the bodies on angularly related axes and the movement of the bodies together or apart during such rotation.

2. A universal coupling for connecting together two rotatable bodies, comprising a pair of longitudinally arcuate arms associated with each body, each arm of each pair being bifurcated at one end, means pivotally coupling the bifurcated ends of the arms of each pair together and to a body, the pivotal axis of the connected bifurcated ends of each pair of arms extending across and through the rotary center of the body, a second pair of arms associated with each body and each being bifurcated at one end, the said bifurcated ends of the second-mentioned pairs of arms being pivotally joined together and pivotally connected to the body at opposite sides of the longitudinal center and for oscillation upon an axis perpendicular to and intersecting the axis of oscillation of the adjacent pair of arms, and a universal pivotal connection between the other ends of the two pairs of arms of one body and the other ends of the two pairs of arms of the other body, the said universal pivotal connections being in the same plane transversely of and passing between the bodies.

3. A universal coupling for joining together a pair of adjacent rotatable bodies, comprising two bearings secured to each body upon opposite sides thereof, a second pair of bearings disposed at opposite sides of each body with the axial centers perpendicular to and in the same plane transversely of the body as the axial centers of the adjacent two bearings, a pair of elongated longitudinally arcuate arms associated with each body and each bifurcated at one end, the arms of each pair having the ends of the furcations in overlapping relation and pivotally coupled together and to a pair of bearings, one of said pair of arms being separated 180° from the other pair of arms and the free ends of the arms of one pair being directed oppositely to the free ends of the arms of the other pair, a second pair of arms associated with each body, each of the arms of said second pair being relatively straight and bifurcated at one end, the bifurcated ends of the second-mentioned pairs of arms being in overlapped relation and pivotally joined together and to the other bearings of the body with which they are associated, the second-mentioned pairs of arms extending laterally from the bodies and being separated 180° apart, and a universal pivotal coupling between the outer ends of each pair of curved arms and the outer ends of the opposed straight arms, said pivotal couplings between the ends of the arms being disposed in a common plane passing transversely between the bodies.

FRANK E. NELSON.